Nov. 6, 1934.  G. E. WILLIAMS  1,980,126
SEPARABLE LINK
Filed June 23, 1933
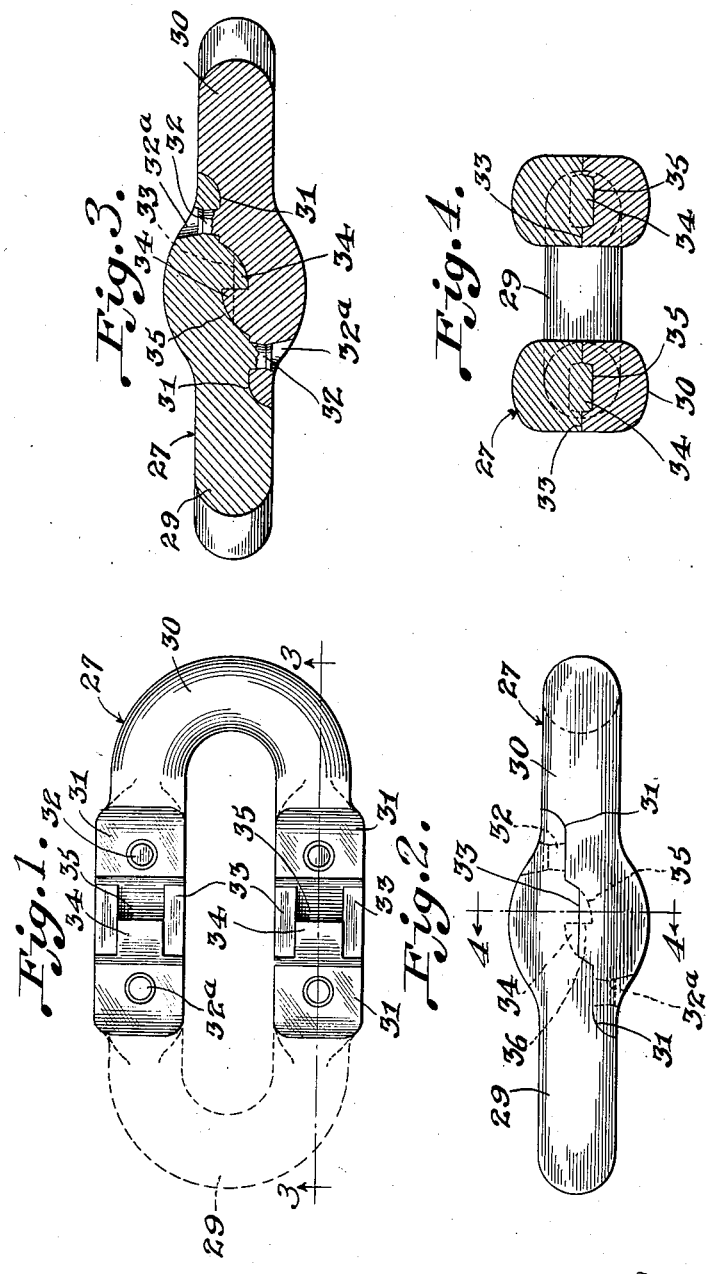
Inventor
G. E. Williams
By N. C. Fetters
Attorney Patented Nov. 6, 1934

1,980,126

UNITED STATES PATENT OFFICE 1,980,126

SEPARABLE LINK

George E. Williams, Alliance, Ohio, assignor to Transue & Williams Steel Forging Corporation, Alliance, Ohio Application June 23, 1933, Serial No. 677,318

3 Claims. (Cl. 59—84)

My invention relates to improvements in chain links, and more particularly to a separable link.

One of the objects of my invention is to provide such a link with the several parts so designed that they may all be manufactured by the drop forging method in hammer dies and thus produce parts with the maximum strength with the minimum weight of material. These links must be small enough to readily fit into a machinist's tool-box and yet be strong enough to withstand enormous strains when in actual use.

A further object of my invention is to provide a separable connecting link composed of identical halves so that both parts may be produced in a single set of hammer dies and to so design the connecting link that it will be stronger than the weakest part of a load boomer or the like with which it may be used, and, one that is readily assembled with ordinary tools and need not be welded together.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the drawing:

Fig. 1 is an enlarged plan view of one half of one of my improved separable links.

Fig. 2 is a side elevation of one of the separable links.

Fig. 3 is a vertical sectional view of a complete link taken on the line 3—3 of Fig. 1.

Fig. 4 is a transverse sectional view of the link taken on line 4—4 of Fig. 2.

Referring to the drawing, 27 designates one of my improved separable links, and each link is made of two identical halves or sections 29 and 30. Each of these sections is of U shape and its ends are provided with curved surfaces 31. A stud 32 projects upwardly from one of these surfaces and the other surface has a hole 32a to receive the stud of the mating section.

Between the curved surfaces the link sections have flat surfaces 33 which are in the same plane, and between the flat surfaces, the section has a projecting tooth 34 positioned opposite a complimentary cavity 35. Thus when two of the mating sections are brought together, the curved surfaces 31 of one section will contact with the curved surfaces 31 of the other section; the studs 32 of one section will enter the holes 32a of the other section, and at the same time the flat surfaces 33 of the two sections will engage one another.

The teeth 34 of each section will enter the cavity 35 of the other section, and as each tooth has a plane surface 36 arranged perpendicular to the flat surfaces 33, the interlocking teeth will take up the strain caused by any pulling action on opposite ends of the link. This construction relieves the pins 32 of such strains.

In assembling the parts of such a link it is only necessary to peen the ends of the studs 32 in order to lock the sections together.

It may be seen from the drawing that each separable link is composed of two identical sections and each section may be drop forged from a round bar of steel.

The flat surfaces 33 are in effect formed at the extremities of reinforcing walls and as these surfaces of the two sections abut one another, the teeth 34 and cavities are enclosed and protected from dirt, etc. Such side walls also assist in maintaining the full section of the metal in the links and hold the parts in accurate alignment at all times.

While I have disclosed a preferred embodiment of the invention in such manner that it may be readily understood by those skilled in the art, it is evident that changes may be made in the details disclosed without going outside of the scope of the appended claims.

What I claim and desire to secure by Letters Patent is:

1. A separable link comprising a pair of link members, said members being bent intermediate the ends thereof to form a pair of identical U-shaped sections, the ends of each section having a pair of spaced curved surfaces, a stud projecting from one of said surfaces and a corresponding hole in the other surface, a complementary tooth and cavity in each end of the section between the curved surfaces of that end, and reinforcing walls for each end of the section positioned at opposite sides of the tooth and cavity of that end.

2. A separable link comprising a pair of link members, said members being bent intermediate the ends thereof to form a pair of identical U-shaped sections, the ends of each section being identical and having a pair of spaced curved surfaces, a stud projecting from one of said surfaces and a corresponding hole in the other surface, a complementary tooth and cavity in each end of the section between the curved surfaces of that end, and reinforcing walls for each end of the section positioned at opposite sides of the tooth and cavity of that end.

3. A separable link comprising a pair of link members, said members being bent intermediate the ends thereof to form a pair of identical U-shaped sections, the ends of each section having a pair of spaced curved surfaces, a stud projecting from one of said surfaces and a corresponding hole in the other surface, a complementary tooth and cavity in each end of the section between the curved surfaces of that end, and reinforcing walls for each end of the section positioned at opposite sides of the tooth and cavity of that end, said stud being spaced from said tooth lengthwise of said section.

GEORGE E. WILLIAMS.